United States Patent Office 3,460,952

Patented Aug. 12, 1969

3,460,952

ELECTROLESS COPPER PLATING

Edward B. Saubestre, Hamden, and Juan Hajdu, New Haven, Conn., assignors to Enthone, Inc., New Haven, Conn., a corporation of Connecticut No Drawing. Filed Jan. 4, 1966, Ser. No. 518,529
Int. Cl. C09d *5/00*; B44d *1/34*
U.S. Cl. 106—1 18 Claims

ABSTRACT OF THE DISCLOSURE

An electroless alkaline aqueous copper plating solution comprising copper ions, a reducing agent for the copper ions, and Rochelle salt as a complexing agent for the copper ions, and wherein the Rochelle salt utilized in the plating solution is that prepared from a technical grade Rochelle salt and is substantially free of fine, predominately colloidal size particles associated with a technical grade Rochelle salt, whereby premature decomposition of the plating solution is eliminated.

This invention relates to electroless copper plating and more particularly to improved stability electroless copper plating solutions containing Rochelle salt, a preparation method for producing such plating solutions, and Rochelle salt-containing compositions especially well suited for use as additives in the formation of electroless copper plating solutions. Additionally this invention relates to a new and improved Rochelle salt of grade intermediate the technical and analytical grades and especially well suited for use as a constituent of electroless copper plating solutions, the preparation of the Rochelle salt, and to an improvement in the chemical reduction plating of copper involving the use of the improved stability electroless copper plating solutions herein.

Electroless copper plating is of considerable importance commercially. Its principal application is in the electronics industry, for instance in the production of printed circuits. In the latter use, electroless copper is employed to render plastic surfaces electrically conductive, especially in the manufacture of "plated-through" hole printed circuit boards. Other applications in the electronics industry take advantage of the high electrical conductivity of thin deposits of electroless copper, as in the coating of epoxy surfaces to produce additive type printed circuits and plating of magnetic tape.

Commercial formulations of electroless copper solutions are usually supplied as two solutions or powders with the copper salt in one solution or powder and the reducing agent in the other. The two solutions or powders and water are mixed together just prior to use, whereby the reduction of the copper ions commences shortly thereafter to plate out metallic copper. In certain commercial formulations, in the case of the solutions, both the copper salt and reducing agent such as formaldehyde may be in one of the solutions with the pH of the solution maintained low enough and on the acid side to prevent the redox reaction, and the other solution, which is an alkaline solution, will contain the alkali and complexing agent.

Rochelle salt, i.e., $KNaC_4H_4O_6 \cdot 4H_2O$, is frequently utilized as a complexing agent in commercial electroless copper plating solutions. It has the property of being capable of complexing the copper ions strongly enough to maintain them in solution, but not so strongly as to prevent the copper from being plated or deposited out of the bath by the redox reaction and onto the substrate or surface to be plated, when this is desired. Accordingly, the Rochelle salt is eminently suited for use as a complexing agent in the electroless copper solutions or baths.

The Rochelle salt usually employed as a complexer in electroless copper baths is a technical grade of Rochelle salt, which is appreciably cheaper in cost than the higher purity analytical grade thereof. However, use of the technical grade Rochelle salt in alkaline aqueous electroless copper plating baths heretofore has been attended with a premature spontaneous decomposition of the bath. Thus, users have complained that alkaline aqueous copper plating baths prepared by mixing together just prior to plating an aqueous copper salt solution containing formaldehyde as reducing agent and an alkaline aqueous complexing agent solution containing technical grade Rochelle salt, have decomposed after only a relatively short period of use, and after as short a time as 8 hours, by all or virtually all of the copper precipitating out of the bath. And this premature decomposition has occurred even though the ingredients of the bath requiring replenishing were replenished as necessary, and impurity particles were filtered from the bath when deemed necessary to do so using a conventional filter which was incapable of removing colloidal size particles from the bath.

We carried out appreciable research and investigatory work in an effort to determine the cause of this premature decomposition of the electroless copper baths. It was concluded the fault did not reside in the copper salt solution as this was an acid solution, and the formaldehyde also present therein could only bring about the reduction and precipitation of the copper under alkaline conditions, i.e. after the alkaline complexing agent solution was mixed together with the copper salt solution. In investigating the aqueous complexing agent solution as a possible cause of the premature decomposition, among various possibilities looked into and approaches used, we examined the solution by viewing the solution laterally while directing a light beam through the solution. In so doing, numerous fine solid particles were observed dispersed in the solution which were not visible in the absence of the light beam. These fine particles were predominately of colloidal size, with the remainder of the particles visually observed being of size larger than colloidal size. The fine predominately colloidal particles were also visually observed with the aid of the light beam in a deionized water solution of only the technical grade Rochelle salt, but no such particles were observed with the light beam in a deionized solution of the analytical grade Rochelle salt. After further investigatory work, including the use of analytical reagent grade materials for each ingredient of the electroless copper bath, we concluded that the finely divided predominately colloidal particles were normally associated with and introduced by the technical grade Rochelle salt, and that such particles were responsible for the premature decomposition of the electroless copper plating baths by serving as nucleation centers or sites for crystallization and "seeding out" of constituents of the bath.

One object of this invention is to provide a new and improved method for the preparation of improved stability electroless copper plating solutions containing Rochelle salt, and having a considerably longer life than prior art electroless copper plating solutions containing Rochelle salt.

Another object is to provide new, improved stability electroless copper plating solutions containing Rochelle salt characterized by having a considerably longer life than prior art electroless copper plating solutions containing Rochelle salt.

Another object is to provide new and improved additive compositions containing Rochelle salt and especially well suited for use in preparation of electroless copper plating solutions of improved stability.

A further object is to provide a new and meritorious improvement in the method for electrolessly plating of copper employing chemical reduction copper plating solutions containing Rochelle salt.

Still another object is to provide a new Rochelle salt of grade intermediate technical grade and analytical grade, and eminently well suited for use as a constituent of electroless copper plating solutions or baths.

Additional objects and advantages will be apparent as the invention is hereafter described.

The preparation process for production of the electroless copper plating solutions of the present invention, in its broader aspects, involves separating the fine predominately colloidal size solid particles from a solution of technical grade Rochelle salt containing the predominately colloidal particles dispersed therein and derived from the Rochelle salt, and mixing together the technical grade thus treated Rochelle salt substantially free of the finely divided predominately colloidal size particles, a copper salt, a reducing agent for ionic copper, alkali and an aqueous liquid. By virtue of the removal of the predominately colloidal size particles from the Rochelle salt prior to mixing this salt with the remaining ingredients of the solution, the premature and spontaneous decomposition of the electroless copper plating solutions encountered with use of the prior art baths containing Rochelle salt is eliminated, and electroless Rochelle salt-containing copper plating baths of considerably longer life than the prior art baths are attained. The increase in life of Rochelle salt-containing copper plating baths of this invention has been as great as about 200% over the prior art electroless copper baths containing Rochelle salt.

By "colloidal size" solid particles as used herein is meant solid particles of size, i.e., diameter, between 1 and 500 millimicrons inclusive. By "predominately" colloidal size as used herein is meant that about 80% or more of the fine solid particles are of size between 1 and 500 millimicrons. The remainder of the fine solid particles that were visually observed when shining the light beam through the solution were of size larger than colloidal size, i.e., larger than 500 millimicrons in size.

The composition of the fine predominately colloidal size solid particles normally associated with and separated from the technical grade Rochelle salt by this invention is not known with certainty. However, such predominately colloidal size solid particles were considered to be organic particles, due to their being stained blue by methylene blue.

The predominately colloidal size particles are separated from the Rochelle salt by filtration of a solution of the Rochelle salt through activated carbon contained in a column or other suitable holder or container. Such colloidal size particles are adsorbed by the activated carbon and thereby separated from the solution during passage of the Rochelle salt-containing solution through the porous activated carbon. Alternatively, the predominately colloidal size particles can be separated from the Rochelle salt by filtering an aqueous Rochelle salt solution through a semipermeable membrane by a process known as ultrafiltration, or by ultracentrifuging. Although water is the preferred solvent for preparing a solution of the Rochelle salt to enable the removal of the predominately colloidal size particles therefrom, any inert liquid solvent for the Rochelle salt in which the fine predominately colloidal size particles are insoluble can be utilized. With use of water as the solvent, an alkaline aqueous solution of the Rochelle salt, suitable for admixing with the aqueous copper salt solution to produce the electroless copper plating solution, can be treated to remove the predominately colloidal size particles in accordance with this invention. Also, a water solution of the Rochelle salt alone can be treated to remove the colloidal size particles herein, and the resulting solution mixed together with the other constituents of the electroless copper plating solution, or the alkali added thereto and the resulting alkaline solution of Rochelle salt mixed together with the aqueous copper salt-containing solution also containing the reducing agent to form the electroless plating solution.

Exemplary of the water-soluble copper salts for use herein are copper sulfate, copper nitrate and copper chloride. Formaldehyde is the preferred reducing agent for the copper ions, but paraformaldehyde or trioxane could be utilized instead, if desired.

The water utilized in the solutions and baths herein is preferably pure or virtually pure water, for instance distilled or deionized water.

The Rochelle salt can be recovered or separated from the water solution thereof, after the removal of the fine predominately colloidal size particles suspended or dispersed therein, by heat evaporating off the water utilizing any suitable evaporator apparatus, or by other suitable separation procedure.

A new and valuable Rochelle salt of grade intermediate the technical and analytical grades of such salt is provided by this invention. This new grade Rochelle salt, prepared from the technical grade Rochelle salt having finely-divided predominately colloidal size particles normally associated therewith, is especially well suited for use in the preparation of electroless copper plating solutions and baths of a considerably improved stability by reason of being free or substantially free of the fine size predominately colloidal size solid particles, as indicated or evidenced by no such particles being dispersed or suspended in pure, deionized water when the Rochelle salt is in solution therein. These predominately colloidal size particles, when present dispersed in the plating solution, have resulted in the premature spontaneous decomposition of the copper baths, by serving as nucleation centers for crystallization and "seeding out" of the copper of the bath. The new grade Rochelle salt of this invention is appreciably more economical than the relatively high price analytical grade Rochelle salt, which is also free of the finely divided predominately colloidal size particles. The new grade Rochelle salt herein also has the properties of being translucent, of rhombic crystal form, melting point 70–80° C., boiling point at 760 mm. Hg of 215° C., density of 1.790 g./cc. soluble in water, and very slightly soluble in lower alkanols such as methanol, ethanol and propanol.

The substrates and surfaces capable of being copper plated with the plating solutions and baths herein are both metallic and nonmetallic substrates and surfaces. Thus ferrous metals, for instance steel and iron, and cobalt and nickel can be plated with copper by the chemical reduction baths herein. Nonmetallic substrates and surfaces that can be plated herein are for example plastic and glass substrates and surfaces. The plastics include thermoplastic and thermosetting plastics and resins, for example, acrylonitrile - butadiene - styrene polymers, polyacrylonitrile, phenolic resins, such as phenol-formaldehyde resins, nylon, methyl and other alkyl acrylate polymers, methacrylate polymers, polyglycolterephthalate polymers, cellulose acetate and cellulose propionate polymers. Use of the product copper-plated substrates and surfaces herein are for printed circuits, for production of magnetic tape, copper mirrors, and for lubrication processes in the case of thin copper films on steel, for instance for die-forming or shaping of steel.

Prior to plating the nonmetallic substrates or surfaces with copper, the surfaces are activated in usual manner, i.e., by contacting the surface or surfaces to be plated with a sensitizer solution, preferably a stannous chloride solution, followed by water rinsing and contacting the sensitized surface with an activator solution containing noble metal ions, e.g., palladium, gold or platinum ions. The resulting redox reaction causes the noble metal ions to be reduced and the catalytic noble metal plated out or deposited on the surface. Alternatively, the activator solution is applied to the surface first followed by the sensitizer solution, with the same redox reaction occurring plating out the activator or catalytic noble metal. The nonmetallic surfaces are roughened, prior to the sensitizing and activating, also in usual manner for purposes of mechanical interlocking of the subsequently deposited copper film or plate with the resultant "hills and valleys" of the surface, to provide firmly adherent films or plates.

The metallic substrates, for instance steel, iron, cobalt or nickel, prior to being plated with copper by this invention, if not already in catalytically activated condition for the plating, is subjected to a conventional cleaning and pickling. The metal substrates are then catalysts for the deposition of copper from the solutions herein by the redox reaction. Further, the substrate, when immersed in the electroless copper solution, may receive a flash of metallic copper deposit by galvanic displacement. This immersion deposit serves as a catalytic surface for the further build up of the copper deposit on the substrate in the electroless solution.

The electroless plating of the copper herein is carried out at a solution or bath temperature which can be room temperature, and solution temperatures above room temperature and up to about 100° C. and solution temperatures slightly below room temperature can also be utilized. The aqueous copper salt solution also containing the formaldehyde and the aqueous alkaline Rochelle salt solution are mixed together with water just prior to the plating preferably in the volume ratio of 1:1:1 to 2:5:9 of the copper salt solution to the Rochelle salt solution to the water respectively. The 1:1:1 ratio is recommended for plating on plastic substrates in the production of printed circuits, while the 2:5:9 ratio is recommended for plating on plastic substrates in the production of automotive and hardware parts and also gives good results in plating on the metal substrates.

The pH of the electroless copper plating solutions or baths herein is preferably 10–13, more preferably 12.2–12.6. The pH is maintained within such ranges by addition of alkali, preferably an alkali metal hydroxide, for instance NaOH.

The following Examples I–III further illustrate the invention but are not restrictive thereof. The water of all solutions and baths of Examples I–III and also of Examples IV–VI herein was deionized water.

EXAMPLE I

An electroless copper plating bath of the composition set forth below was prepared by mixing together the following copper salt solution and reducing agent solution and deionized water in a volume ratio of 1:1:1 respectively just prior to plating with the bath:

Copper salt solution

| | Grams per liter of water |
|---|---|
| Copper sulfate | 59 |
| Formaldehyde (37% solution) | 315 |

Complexing agent solution

| | |
|---|---|
| Technical grade Rochelle salt | 183 |
| Sodium carbonate | 17 |
| Sodium hydroxide | 40 |

Electroless copper plating bath

| | |
|---|---|
| Copper sulfate | 20 |
| Technical grade Rochelle salt | 61 |
| Sodium carbonate | 6 |
| Formaldehyde (37% solution) | 105 |

This plating bath was utilized at room temperature to plate copper on a previously activated surface of a plastic substrate in the production of printed circuits. The plastic surface was first sensitized by contacting it with a stannous chloride solution, followed by rinsing and contacting the sensitized surface with an activator solution, which was an aqueous solution containing palladium ions. The bath underwent a spontaneous decomposition after 8 hours of plating. And this decomposition occurred even though ingredients of the bath requiring replenishing were replenished during the plating, and the bath was filtered to remove impurity particles of size larger than colloidal size, when this was deemed necessary, with a conventional filter medium, which was incapable of removing colloidal size particles from a liquid.

EXAMPLE II

A copper salt solution and complexing agent solution containing technical grade Rochelle salt of substantially identical compositions as the copper salt solution and complexing agent solution of Example I were separately examined by viewing the solutions laterally to a beam of light directed at and passing through the solutions. The complexing agent solution showed numerous finely divided predominately colloidal solid particles dispersed in the solution. The copper salt solution was free of dispersed or suspended solid particles. The complexing agent solution was then filtered through a packed cylinder of activated carbon which removed the colloidal particles from the liquid by adsorption, as subsequently determined by viewing the solution laterally to a light beam passing through the solution. The thus treated Rochelle salt complexing agent solution and copper salt solution and deionized water were then mixed together in a volume ratio of 1:1:1, respectively, to produce an electroless copper plating bath. This bath was utilized under substantially identical conditions as in Example I to plate metallic copper on a previously activated surface of a plastic substrate in the production of printed circuits. The surface of the plastic substrate was sensitized and activated in substantially identical manner as employed in Example I. The bath gave good results in plating for three weeks' time before decomposing. Ingredients of the bath requiring replenishing were replenished when required during this period, and impurity particles of size larger than colloidal size were removed from the bath when this was deemed necessary by filtration through a conventional filter medium incapable of removing colloidal size particles from the bath.

EXAMPLE III

An electroless copper plating bath was prepared by mixing together a copper salt solution and complexing agent solution of substantially identical compositions as those of Example I except that analytical grade Rochelle salt was utilized in the complexing agent solution of this example instead of the technical grade Rochelle salt, and deionized water in a volume ratio of 1:1:1, respectively. The bath was utilized under substantially identical conditions as in Example I to plate metallic copper on a previously activated surface of plastic substrates in the production of printed circuits. The plastic surfaces were sensitized and activated in substantially identical manner as in Example I. The bath gave good results for the plating for the three weeks' time before decomposing. Replenishment of indgredients of the bath requiring replenishing was done when necessary during this time, and the bath was filtered, when deemed necessary to do so, to remove impurity particles of size larger than colloidal size with a conventional filter medium which was incapable of removing colloidal size particles.

A complexing agent solution of the same composition as that used in preparing the copper plating bath of this example was examined by viewing the solution laterally to a light beam directed at and passing through the solution. No dispersed or suspended particles were present in the solution.

The following Examples IV–VI further illustrate complexing agent solutions of this invention containing Rochelle salt treated in accordance with the invention, as well as copper salt solutions and electroless copper plating baths containing the Rochelle salt of the invention.

EXAMPLE IV

Part A.—Copper salt solution

| | Per liter of water |
|---|---|
| Copper sulfate g | 90 |
| Formaldehyde (37% solution) ml | 90 |

Part B.—Complexing agent solution

| | Grams per liter of water |
|---|---|
| Rochelle salt from which the finely divided predominately colloidal size particles normally associated therewith have been separated by filtration through activated carbon of an aqueous solution of technical grade Rochelle salt | 300 |
| Sodium carbonate | 90 |
| Sodium hydroxide | 150 |

The copper salt solution of Part A and complexing agent solution of Part B of this example and water, when mixed together in a volume ratio of 1:1:1 respectively, yields an electroless copper plating bath of the following composition:

Part C.—Electroless copper plating bath

| | Per liter of water |
|---|---|
| Copper sulfate grams | 30 |
| Rochelle salt from which the finely divided predominately colloidal size particles normally associated therewith have been separated by filtration through activated carbon of an aqueous solution of technical grade Rochelle salt grams | 100 |
| Sodium carbonate do | 30 |
| Formaldehyde (37% solution) ml | 30 |
| Sodium hydroxide grams | 50 |

This bath is employed for plating at a bath temperature of typically about 75° F., and has a pH of about 11.5.

EXAMPLE V

Part A.—Copper salt solution

| | Grams per liter of water |
|---|---|
| Copper sulfate | 87 |
| Formaldehyde (37% solution) | 498 |

Part B.—Complexing agent solution

| | |
|---|---|
| Rochelle salt from which the finely divided predominately colloidal size particles normally associated therewith have been separated by filtration through activated carbon of an aqueous solution of technical grade Rochelle salt | 420 |
| Sodium hydroxide | 120 |

The copper salt solution and complexing agent solutions of Parts A and B of this example and water, when mixed together in a volume ratio of 1:1:1 respectively, yields an electroless copper plating bath of the following composition:

Part C.—Electroless copper plating bath

| | Grams per liter of water |
|---|---|
| Copper sulfate | 29 |
| Rochelle salt from which the finely divided predominately colloidal size particles normally associated therewith have been separated by filtration through activated carbon of an aqueous solution of technical grade Rochelle salt | 140 |
| Sodium hydroxide | 40 |
| Formaldehyde (37% solution) | 166 |

This bath has a pH of 11.5 and is employed for plating at a bath temperature of typically about 70° F.

EXAMPLE VI

Part A.—Copper salt solution

| | Grams per liter of water |
|---|---|
| Copper sulfate | 58 |
| Formaldehyde (37% solution) | 332 |

Part B.—Complexing agent solution

| | |
|---|---|
| Rochelle salt from which the finely divided predominately colloidal size particles normally associated therewith have been separated by filtration through activated carbon of an aqueous solution of technical grade Rochelle salt | 280 |
| Sodium carbonate | 50 |
| Sodium hydroxide | 80 |
| Versene T[1] | 34 |

[1] Versene T is a mixture of EDTA and triethanolamine obtainable in commerce.

The copper salt solution and complexing agent solution of Parts A and B of this example, when mixed together in a volume ratio of 1:1 respectively, produced an electroless copper plating bath of the following composition:

Part C.—Electroless copper plating bath

| | Grams per liter of water |
|---|---|
| Copper sulfate | 29 |
| Rochelle salt from which the finely divided predominately colloidal size particles normally associated therewith have been separated by filtration through activated carbon of an aqueous solution of technical grade Rochelle salt | 140 |
| Sodium carbonate | 25 |
| Versene T | 17 |
| Sodium hydroxide | 40 |
| Formaldehyde (37% solution) | 166 |

This bath is utilized for plating at a bath temperature of optimally about 70° F., and has a pH of 11.5. It is a high speed plating bath, with a Cu plating rate of about 1.0 mil/hour, as contrasted with a 0.1 mil/hour Cu plating rate of the bath of Example V, Part C, which is a general purpose bath.

The Rochelle salt complexing agent herein can be supplied as a solution or a solid additive, preferably as a powder in the case of the solid. Exemplary of the solutions is an aqueous solution containing the Rochelle salt of grade between technical and analytical grades and from which the finely divided predominately colloidal particles associated therewith have been separated from an aqueous solution of a technical grade of Rochelle salt containing such finely divided particles normally associated therewith, an alkali, for instance an alkali metal hydroxide, e.g., caustic soda, and an alkali metal carbonate, e.g. sodium carbonate; and a water solution of the new grade Rochelle salt of this invention with or without the alkali metal hydroxide or the carbonate.

The proportions of ingredients in the solutions and baths herein can be varied over wide limits depending on whether the customer wants ready-to-use plating solutions or baths, or concentrates from which he himself will prepare the plating solutions. Typically, the Rochelle salt is present in the complexing agent solution in amount from about 150–425 grams per liter, the alkali such as the alkali metal hydroxide in amount from about 35–160 grams per liter, and the alkali metal carbonate, when utilized, in amount from about 15–100 grams per liter. In addition to the liquid solution, the Rochelle salt can be supplied as a solid additive composition, preferably as a powder, comprising a mixture of the new Rochelle salt herein of grade intermediate the technical and analytical grades and free of the fine predominately colloidal size particles, and the alkali metal hydroxide and/or the alkali metal carbonate and/or paraformaldehyde.

Typically, the copper plating solution herein contains from about 3–8 grams per liter of the copper ion and from about 20–175 grams per liter of the reducing agent, such as formaldehyde, for the ionic copper, with the alkali present in amount sufficient to bring the pH of the solution within the range of 10–13, inclusive. When an alkali metal carbonate is an ingredient, it is typically present in amount from about 4–30 grams per liter. The copper salt-containing solution also containing the reducing agent such as formaldehyde, which is mixed together with the complexing agent solution, typically contains from about 35–100 grams per liter of the copper salt and from about 75–500 grams per liter of the formaldehyde.

With respect to the solid additive compositions, that comprising the new Rochelle salt herein and the alkali metal hydroxide typically contains, by weight, from about 40–80% of the Rochelle salt, from about 12–30% of the alkali metal hydroxide and the balance an inert filler, e.g., sodium sulfate; the additive comprising the new Rochelle salt and the alkali metal carbonate will typically contain, by weight, from about 40–80% of the Rochelle salt and from about 5–20% of the alkali metal carbonate and the balance inert filler, e.g., sodium sulfate; and the additive comprising the new Rochelle salt herein and the paraformaldehyde herein will typically contain, by weight, from about 40–80% of the Rochelle salt and from about 60–20% of the paraformaldehyde.

Formaldehyde is the preferred reducing agent for the copper ions, and can be supplied to the plating solution either as such or as a compound providing formaldehyde therein, for instance paraformaldehyde or trioxane. When supplied as such, it is preferably supplied as an aqueous solution of formaldehyde, for instance as formaline.

The presence of the carbonate in the solutions or baths results in an increased speed of plating. The triethanolamine in the bath also results in an increased metal plating rate. The EDTA, i.e., ethylenediamine tetraacetic acid soluble salt, in the bath or solution also increases the plating bath, but may noticeably darken the metal deposit and also result in nodular deposits of the metal.

In addition to plating copper, the present invention can be utilized to plate an intimate mixture of copper and nickel. The mixture of the metallic copper and nickel result in metallic films or plates of greater hardness, although the copper alone will produce sufficiently hard deposits, films or plates for most purposes. When the copper-nickel mixture is to be plated, a water-soluble nickel salt is incorporated into the solution or bath as an ingredient in addition to the copper salt. Exemplary of the soluble nickle salts are nickel nitrate and nickel sulfate.

What is claimed is:

1. In a process for the preparation of an electroless copper plating solution comprising mixing together Rochelle salt, a copper salt, a reducing agent for copper ions, an alkali metal hydroxide and an aqueous liquid, the improvement which comprises utilizing as the Rochelle salt a Rochelle salt substantially free of fine predominately colloidal size solid particles and obtained by separating the fine predominately colloidal size solid particles associated with a technical grade Rochelle salt from said Rochelle salt, the amount of such particle-free Rochelle salt being sufficient to maintain the copper ions in solution until plated out of solution onto a desired surface by a redox reaction.

2. The process of claim 1 wherein the fine predominately colloidal size solid particles are separated from a liquid solution of the technical grade Rochelle salt.

3. In an electroless alkaline aqueous copper plating solution comprising copper ions, a reducing agent for the copper ions, an alkali metal hydroxide, and Rochelle salt as a complexing agent for the copper ions, the improvement which comprises utilizing as the Rochelle salt in the solution a Rochelle salt prepared from a technical grade Rochelle salt and substantially free of fine predominately colloidal size solid particles, the amount of such particle-free Rochelle salt being sufficient to maintain the copper ions in solution until plated out of solution onto a desired surface by a redox reaction.

4. The plating solution of claim 3 wherein the reducing agent is formaldehyde, and also characterized by containing an alkali metal carbonate.

5. The plating solution of claim 4 wherein the alkali metal hydroxide is sodium hydroxide, the alkali metal carbonate is sodium carbonate, and the pH of the bath is within the range of 10–13.

6. The plating solution of claim 3 wherein said solution is obtained by mixing together, in the volume ratio of 1:1:1 to 2:5:9, respectively, an aqueous copper salt-containing solution, an aqueous alkaline Rochelle salt-containing solution, and water, the copper salt-containing solution containing from about 35–100 grams per liter of the copper salt and from about 75–500 grams per liter of formaldehyde aqueous solution of 37% formaldehyde concentration, and the aqueos alkaline Rochelle salt-containing solution containing from about 150–425 grams per liter of the Rochelle salt, from about 35–160 grams per liter of the alkali metal hydroxide, and from about 15–100 grams per liter of the alkali metal carbonate.

7. The plating solution of claim 3 wherein the Rochelle salt substantially free of fine predominately colloidal size solid particles is obtained by separating the fine predominately colloidal size solid particles from a liquid solution of technical grade Rochelle salt by adsorption on activated carbon during passage of said solution through the activated carbon.

8. A liquid composition well suited for use in electroless copper plating solutions comprising an aqueous liquid having dissolved therein Rochelle salt substantially free of fine predominately colloidal size solid particles previously associated therewith, and an alkali metal hydroxide, the Rochelle salt being obtained by separating the fine predominately colloidal size solid particles associated with a technical grade Rochelle salt from a liquid solution of said Rochelle salt.

9. The composition of claim 8 wherein the aqueous liquid is water and further characterized by containing an alkali metal carbonate.

10. The composition of claim 8 wherein the Rochelle salt is present therein in amount from about 150–425 grams per liter and the alkali metal hydroxide in amount from about 35–160 grams per liter.

11. A solid additive composition well suited for use in electroless copper plating solutions comprising a mixture of a Rochelle salt substantially free of fine predominately colloidal size solid particles previously associated therewith, and an alkali metal hydroxide, the Rochelle salt being obtained by separating the fine predominately colloidal size solid particles associated with a technical grade Rochelle salt from a liquid solution of said Rochelle salt.

12. The composition of claim 11 further characterized by containing an inert filler and wherein the ingredients are present therein in amounts, by weight, from about 40%–80% of the Rochelle salt, and from about 12%–30% of the alkali metal hydroxide, balance the filler.

13. A solid additive composition well suited for use in electroless copper plating solutions comprising a mixture of a Rochelle salt substantially free of fine predominately colloidal size solid particles previously associated therewith, and paraformaldehyde, the Rochelle salt being obtained by separating the fine predominately colloidal size solid particles associated with a technical grade Rochelle salt from a liquid solution of said Rochelle salt.

14. The composition of claim 13 wherein the Rochelle salt is present therein in amount from about 40%–80%, and the paraformaldehyde in amount from about 60%–20%, percentages being by weight.

15. A solid additive composition especially well suited for use in electroless copper plating solutions comprising a mixture of a Rochelle salt substantially free of fine predominately colloidal size solid particles previously associated therewith, and an alkali metal carbonate, the Rochelle salt being obtained by separating the fine predominately colloidal size solid particles associated with a technical grade Rochelle salt from a liquid solution of said Rochelle salt.

16. The composition of claim 15 further characterized by containing an inert filler and wherein the ingredients are present therein in amounts by weight, from about 40%–80% of the Rochelle salt, from about 5%–20% of the alkali metal carbonate, balance the filler.

17. A composition will suited for use in electroless copper plating solutions comprising a mixture of a Rochelle salt prepared from a technical grade Rochelle salt and substantially free of fine predominately colloidal size solid particles, and at least one material selected from the group consisting of an alkali metal hydroxide and an alkali metal carbonate.

18. A composition well suited for use in electroless copper plating solutions comprising an aqueous solution of a Rochelle salt prepared from a technical grade Rochelle salt and substantially free of fine predominately colloidal size solid particles.

References Cited

UNITED STATES PATENTS

| | | | |
|---|---|---|---|
| 2,874,072 | 2/1959 | Cahill et al. | 106—1 XR |
| 3,134,690 | 5/1964 | Eriksson | 117—47 |

JULIUS FROME, Primary Examiner

L. HAYES, Assistant Examiner

U.S. Cl. X.R.

117—47, 124, 130

PO-1050
(5/69)

UNITED STATES PATENT OFFICE
CERTIFICATE OF CORRECTION

Patent No. 3,460,952 Dated August 12, 1969

Inventor(s) Edward B. Saubestre and Juan Hajdu

It is certified that error appears in the above-identified patent and that said Letters Patent are hereby corrected as shown below:

Column 3, line 15, -- technical grade-- should be inserted after "the" (first occurrence) and before "Rochelle salt"; line 15, after "the" (second occurrence) "technical" should be deleted; line 16, "grade" should be deleted. Colu 4, line 41, a comma should be inserted after "cc." and befor "soluble". Column 5, line 46, "reducing" should read --complexing--. Column 10, line 3, "3" should read --4--; line 11, "aqueuos" should read --aqueous--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents